April 14, 1936.  R. B. HILL  2,037,130
IMITATION LEATHER AND MANUFACTURE THEREOF
Filed March 28, 1933
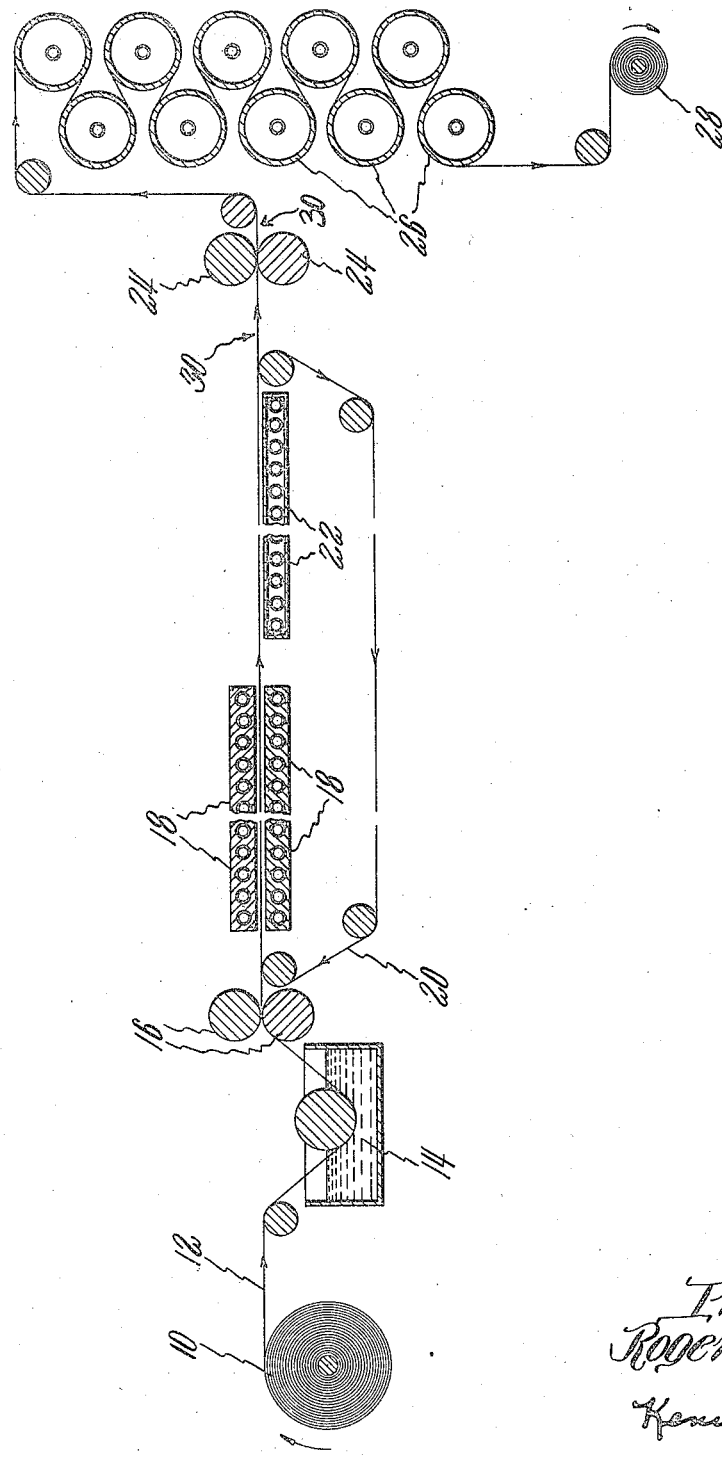
Inventor
Roger B. Hill
Kenway & Witter
Atty Patented Apr. 14, 1936

2,037,130

UNITED STATES PATENT OFFICE 2,037,130

IMITATION LEATHER AND MANUFACTURE THEREOF

Roger Benson Hill, Peabody, Mass.

Application March 28, 1933, Serial No. 663,156

10 Claims. (Cl. 91—68)

This invention relates to imitation leather and the like and to the manufacture thereof, wherein a fibrous sheet is treated with a colloidal suspension, such as rubber latex or compounds thereof. The commonly practiced method of producing this product involves briefly the saturation or impregnation of a loosely felted fibrous sheet with rubber latex and thereafter drying the sheet to remove the water vehicle and leave the solids impregnated within the sheet. This method has various limitations and objections, among which may be mentioned the following.

In the drying out step of the process, the solid particles migrate toward the surfaces of the sheet and thereby cause an uneven and non-uniform composition or product. This is caused by the comparative stability of the suspension due to natural or added stabilizing agents, preventing the separation or precipitation of the solids where located at the moment of saturation. The stability of the suspension may be partially destroyed by chemical or physical treatment of such suspension or by the addition of an agent to effect this result and improve the uniformity of the saturated fibrous sheet, but this often proves unsatisfactory because of partial coagulation or aggregation of particles of the suspension prior to its introduction into the sheet. This variation of the process also requires skillful and careful handling, and, furthermore, the addition of a chemical may be quite undesirable and deleteriously affect the product.

Other objections to the method heretofore known and practised reside in the fact that the fibrous sheet becomes very fragile upon being saturated and must, therefore, be handled with great care, and the adhesive or sticky nature of the partially dried sheet results in considerable damage to the sheet in the drying thereof, due more especially to the sheet coming into contact with the supports therefor.

I have discovered a new and improved method of accomplishing this treatment more efficiently and in a manner eliminating the above-stated objections and limitations. This new process contemplates the use of such colloidal suspensions as are capable of being broken by freezing and involves the destruction of such a suspension within the saturated sheet to effect quick precipitation of the solid particles thereof and leave them evenly and uniformly distributed throughout the sheet. The destruction of the suspension is brought about by freezing the saturated sheet to a degree causing the water vehicle of the suspension to crystallize out. The first result of the freezing is an increase in the viscosity of the suspension, whereby the texture of the sheet is so strengthened that the sheet may be conveniently handled without danger of breakage. Drying of the sheet may be accomplished in any desired and convenient manner, as by the usual method of conveying it through a dried or by passing the sheet through a zone having a sufficiently high temperature to melt the ice and thereafter continuing the sheet over and in contact with a heated drying surface or surfaces. It will be understood that this last-stated step is possible in my improved process since the surfaces of the sheet are moist only from the melted ice and are, therefore, substantially non-adherent.

While the practicing of my invention is not limited to any particular means or apparatus, I have deemed it advisable herein to illustrate diagrammatically certain mechanism for the purpose of aiding in the description of the method. The figure shown in the accompanying drawing is a diagrammatic representation of one form of apparatus which may be used in carrying out my invention.

A roll 10 of fibrous sheet material 12 to be treated is first passed through a bath 14 of latex or other colloidal suspension capable of being broken by freezing, the sheet preferably being submerged in the bath whereby thoroughly to saturate the fibres thereof. It will be understood that the bath may be rubber latex or any compounds thereof and may have been pre-vulcanized or previously treated with vulcanizing agents or the like, as may be found desirable to produce the results desired. As an example of a very simple and suitable bath and sheet, I may mention that a latex diluted to 20% total solids, used with a fibre web capable of absorbing from three to seven times its weight of the suspension, has been found to be quite satisfactory. From the bath, the sheet passes between a pair of squeezing rolls 16 which may be adjusted forcibly to complete the saturating operation and leave only the desired amount of the suspension in the fabric, or may be adjusted to remove only the excess of suspension from the exterior of the sheet. The saturated sheet is next passed through a freezing zone, which may be provided by and between two refrigerated plates 18, the plates being so spaced that both surfaces of the sheet are closely adjacent thereto during the entire passage through the zone.

The saturated sheet coming from the rolls 16 is relatively fragile and may be conveniently handled by an endless web 20 of wire or other suitable material, although in some cases it may be desirable to reinforce the sheet with a sizing material, prior to its treatment at 14, thus imparting strength thereto and eliminating the necessity for the supporting web 20. The web may extend not only through the freezing zone but also through a heating zone provided by a heated plate 22, it being understood that the freezing and heating zones will be of such length as is necessary to effect the desired results. The temperature within the freezing zone is preferably such as quickly to cause the congealing of the suspension and to cause freezing out of the water thereof before the sheet leaves the zone. The quick congealing of the suspension toughens the sheet for its further passage and treatment, and the freezing out of the water causes the solid particles of the suspension to be precipitated in the sheet where located at the moment of saturation.

Upon leaving the freezing zone, the sheet may be dried in any convenient and desirable manner. I have illustrated the sheet as passing over the heated plate 22, which serves to melt the ice formed therein. In some cases a portion of the moisture thus formed may be removed by passing the sheet between a pair of rolls 24, and the drying may be completed by continuing the sheet around and in contact with a plurality of drying cans 26 which serve quickly to bring the product to the desired condition, the dried sheet being then rolled at 28.

Another important step in my process is its adaptability of a working operation to strengthen the sheet and give it greater flexibility. Working of sheets of this nature and for this purpose, as by stretching, bending back and forth, kneading, etc., has been known heretofore but has been possible only after drying of the sheet and has required a re-wetting thereof, this re-wetting, working and re-drying thus requiring a second and independent treatment involving a further series of steps. Since in my process the solids have been precipitated prior to the drying operation, the sheet may be freely worked prior to drying. This working operation will ordinarily be performed while the vehicle is substantially in liquid form, and its location may be generally that designated on the accompanying drawing by the reference character 30, either forwardly or rearwardly of the rolls 24. It will be understood that the working of the sheet causes aggregation of the solid particles, thus imparting strength and flexibility to the product.

The rubber deposit and the completed product obtained by my method may be in a fairly dense, closely coherent form (high specific gravity) or may be somewhat porous in formation (low specific gravity), as desired. For instance, latex of high solids tends to give a deposit having very minute pores or none at all, and latex of low solids tends to give a more porous rubber formation. Likewise, variations may be obtained within wide limits by varying the time element and speed at which the freezing is carried out and the suspension broken and solids deposited. Indeed it is possible to obtain a new product of a spongy rubber formation reinforced with incorporated fibres or deposits of a spongy rubber coagulum on the fibrous sheet. In case such a product is desired, of course, pressing and squeezing operations, which would again compact the sheet, would be avoided and the sheet would be so handled in the subsequent drying as to avoid this. Alternatively, should it be desired to avoid any porosity in the rubber fibrous sheet, this can easily be accomplished by passing the sheet through suitable pressure rolls at any point after the ice has been thawed out but preferably before the sheet is thoroughly dry.

My improved process as above outlined not only greatly simplifies the procedure heretofore necessary to produce the desired product but also serves to produce a superior and more uniform product. The saturating suspension comprising the bath 14 requires no preliminary treatment, thus eliminating the difficulties heretofore attending such treatments. The freezing step strengthens the saturated sheet, whereby to render it less liable to breakage, and serves quickly to precipitate the solid particles uniformly throughout the sheet. As thus treated, the sheet consists principally of the original fibre, precipitated solids and water and it may, therefore, be quickly dried by direct contact with heated drying surfaces. This quick drying feature is not possible in the methods heretofore practised, since the colloidal suspension in the saturated sheet leaves the partially dried sheet surfaces sticky before drying has progressed far enough to eliminate the same. Thus the improved process is superior and more rapid than like processes heretofore known and eliminates the objections heretofore present in both process and product, as has been above set forth.

Having thus described my invention, what I claim as new and desire to secure by Letters Patent is:

1. A method of making a rubber impregnated fibrous sheet of low specific gravity, comprising the impregnating of a loosely felted fibrous sheet with spongy rubber solids in suspension, subjecting the impregnated sheet to a temperature freezing out the liquid vehicle of the suspension, subjecting the sheet to a temperature melting the vehicle, and removing the melted vehicle.

2. A method of making a rubber impregnated fibrous sheet of relatively high specific gravity and non-porous character, comprising the impregnating of a loosely felted fibrous sheet with rubber solids in suspension, subjecting the impregnated sheet to a temperature freezing out the liquid vehicle of the suspension, subjecting the sheet to a temperature melting the vehicle, and mechanically compressing the sheet to remove a portion of the melted vehicle and compact the solids together and into the sheet.

3. A method of impregnating a loosely felted fibrous sheet with the rubber solids of latex, comprising the treating of the interior of the sheet with the latex, and subjecting the treated sheet to a temperature below the freezing point of the liquid vehicle of the latex for a time sufficient to freeze out and separate the vehicle from the solids.

4. A method of impregnating a loosely felted fibrous sheet with the rubber solids of latex, comprising the treating of the interior of the sheet with the latex, subjecting the treated sheet to a temperature below the freezing point of the liquid vehicle of the latex for a time sufficient to freeze out and separate the vehicle from the solids, and thereafter removing the frozen out vehicle from the sheet.

5. A method of impregnating a loosely felted fibrous sheet with the solids of a rubber suspension capable of being broken by freezing, comprising the treating of the sheet with the suspension, subjecting the treated sheet to a temperature freezing out the liquid vehicle of the suspension, subjecting the sheet to a temperature melting the vehicle, mechanically working the sheet in a manner aggregating the rubber particles and giving flexibility and strength to the sheet, and drying the sheet.

6. A method of impregnating porous material with rubber, which comprises the saturating of the porous material with a water dispersion of rubber to distribute the rubber particles uniformly throughout the material, then setting the rubber particles in the porous material by freezing, and subsequently drying the material without substantially altering the distribution of the rubber particles.

7. A sheet product comprising a fibrous sheet impregnated with the solids of rubber latex precipitated from a latex emulsion in the sheet by freezing the liquid vehicle thereof whereby said solids are deposited through the sheet in substantially the locations occupied before the emulsion was broken and the vehicle thereof removed.

8. A sheet product of relatively low specific gravity, comprising a fibrous sheet impregnated with the spongy rubber solids of a rubber suspension precipitated from a latex suspension in the sheet by freezing the liquid vehicle thereof whereby said solids are deposited through the sheet in substantially the locations occupied before the suspension was broken and the vehicle thereof removed.

9. A sheet product of relatively high specific gravity, comprising a fibrous sheet impregnated with the rubber solids of a rubber suspension precipitated from a latex suspension in the sheet by freezing the liquid vehicle thereof whereby said solids are deposited through the sheet in substantially the locations occupied before the suspension was broken and the vehicle thereof removed, the solids being mechanically compacted together and into the sheet to form a non-porous unit.

10. A method of making in continuous strip form a rubber impregnated loosely felted fibrous sheet comprising the passing of a sheet along a predetermined path, impregnating the sheet with spongy rubber solids in suspension at one portion of the path, subjecting the impregnated sheet to a temperature freezing out the liquid vehicle of the suspension at a subsequent portion of the path, and removing the frozen out vehicle from the sheet at a further subsequent portion of the path.

ROGER BENSON HILL.